United States Patent [19]

Braun et al.

[11] Patent Number: 5,029,334

[45] Date of Patent: Jul. 2, 1991

[54] PROCESS FOR TRANSFERRING DATA PACKETS

[75] Inventors: Walter Braun, Wettingen; Walter Hagmann, Suhr, both of Switzerland

[73] Assignee: Asea Brown Boveri Ltd., Baden, Switzerland

[21] Appl. No.: 497,118

[22] Filed: Mar. 21, 1990

[30] Foreign Application Priority Data

Mar. 21, 1989 [CH] Switzerland .................. 1046/89

[51] Int. Cl.$^5$ .................................. H04Q 11/04
[52] U.S. Cl. ............................. 370/60; 370/94.10; 370/16; 370/95.10; 455/135; 455/33; 379/60; 340/310 A; 340/310 R
[58] Field of Search .............. 370/60, 60.1, 94.1, 370/94.2, 16, 95.1, 95.2, 18; 340/310 A, 310 R, ; 379/60; 455/135, 33

[56] References Cited

U.S. PATENT DOCUMENTS

| | | |
|---|---|---|
| 3,860,872 | 1/1975 | Richardson et al. ............. 455/135 |
| 4,417,758 | 12/1983 | Dorey ............................. 375/38 |
| 4,545,921 | 6/1986 | Wang et al. ................... 370/95.2 |
| 4,748,655 | 5/1988 | Thrower et al. ................ 379/60 |
| 4,765,753 | 8/1988 | Schmidt ........................... 370/18 |
| 4,825,206 | 4/1989 | Brice, Jr. et al. ................ 370/16 |
| 4,926,421 | 5/1990 | Kawano et al. ................ 370/95.1 |

FOREIGN PATENT DOCUMENTS

| | | |
|---|---|---|
| 1071976 | 2/1984 | U.S.S.R. ....................... 455/135 |
| 2176972 | 1/1987 | United Kingdom . |
| 85/03825 | 8/1985 | World Int. Prop. O. . |

Primary Examiner—Douglas W. Olms
Assistant Examiner—Dang Ton
Attorney, Agent, or Firm—Oblon, Spivak, McClelland, Maier & Neustadt

[57] ABSTRACT

A process for transferring data packets in a network having a master station, plural subscriber stations, and a common gated channel, wherein each subscriber station records the data package received by it and a transmission quality level of the data package received by the respective subscriber station; each subscriber station reports the recorded transmission quality levels to the master station; the master station determines at least one data routing for each subscriber station on the basis of the transmission quality levels reported to the master station; and a data packet directed to a certain subscriber station is transferred according to the determined data routing. The process is particularly suitable fo the transferral of data packets via the supply lines of a medium- and low-voltage network.

9 Claims, 1 Drawing Sheet

PROCESS FOR TRANSFERRING DATA PACKETS

BACKGROUND OF THE INVENTION

1. Field of the Invention

The invention relates to a process for transferring data packets in a network having a master station, at least one subscriber station and a common data channel.

2. Discussion of Background

Patent applications EP-0,208,872, EP-0,231,457, EP-0,236,558 and EP-0,238,813 disclose signal transmission processes which are especially suitable for the transmission of data on the lines of a low- and or medium-voltage network. They are distinguished by the fact that they are matched to the time- and frequency-dependent interference properties of the transmission channel, which results in a greatly improved availability of the individual data connections with simultaneously smaller transmit power.

However, to implement a supervisory system in low- and medium-voltage networks, in addition to a signal transmission, which is as immune to interference as possible, between an individual transmitter and a receiver, a process is also required for controlling the exchange of data between a plurality of subscribers. In particular, the location and time-dependent transmission reliability of the common data channel is to be taken into account.

An important point is represented by the flexibility of the system. It should be possible to extend the network without a large outlay.

SUMMARY OF THE INVENTION

Accordingly, one object of this invention is to provide a novel process for transferring data packets in a network having a master station, at least one subscriber station and a common data channel, which ensures a reliable and efficient exchange of data via the data channel which is subject to location- and time-dependent interference.

According to the invention a solution consists in that, in a process of the type mentioned at the beginning, (a) at least one of the subscriber stations records the data packets received by it and in each case a variable for determining the transmission quality of said data packets, (b) in that at least one of the subscriber stations reports the recorded transmission quality levels to the master station, (c) in that the master station determines at least one data routing for at least one of the subscriber stations on the basis of the transmission quality levels reported to it, (d) and in that data packets which are intended for at least one of the subscriber stations are transferred according to the determined data routing.

In order to take the timing changes of the interference characteristic into account, in a preferred exemplary embodiment the subscriber stations are interrogated at certain, regular or irregular intervals in respect of their transmission quality levels. In addition, the master station itself tests the transmission quality to each subscriber station and if appropriate determines a new data routing.

It is particularly advantageous if when incorporating a new subscriber station, the master station transfers one data packet which contains a quality characteristic for the connection joining the master station and the new subscriber station, and if the new subscriber station only replies when the quality characteristic fulfills a predetermined criterion.

The invention is preferably used for a supervisory system on low- and/or medium-voltage networks.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
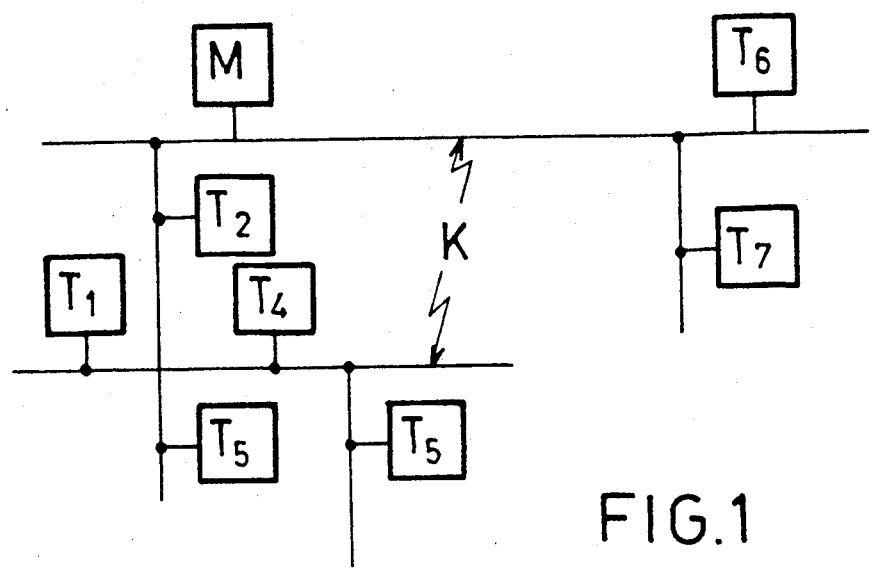
FIG. 1 shows a network having a master station, a plurality of subscriber stations and a power supply network as a common data channel.

Referring now to the drawings, wherein like reference numerals designate identical or corresponding parts throughout the several views, FIG. 1 shows a network having a master station M and a plurality of subscriber stations T1, ..., T7, which are connected to one another by a common data channel K. The master station M controls the exchange of data in the network. It issues commands and requests data.

An electrical distributor network at the low- and/or medium-voltage level is preferably used as the data channel. The master station M and the subscriber stations T1, ..., T7 are for example transmitter/receiver stations which are coupled to the electrical lines at switching units and consumers and which are suitable for transmitting and receiving FH/PSK signals (FH=frequency hopping; PSK=phase shift keying). It is not necessary for all the stations to be located on the same voltage level. A system which extends over both of the voltage levels mentioned can be found for example in EP-0231457 referred to at the beginning. For details in respect of signal transmission with FH/PSK signals please refer to the published patent application also cited at the beginning.

The invention has the object of carrying out the transferral of data packets in such a network in such a way that said data packets are matched as well as possible to the characteristic of the data channel. It is now described below how this object can be preferably achieved.

Figure 2:
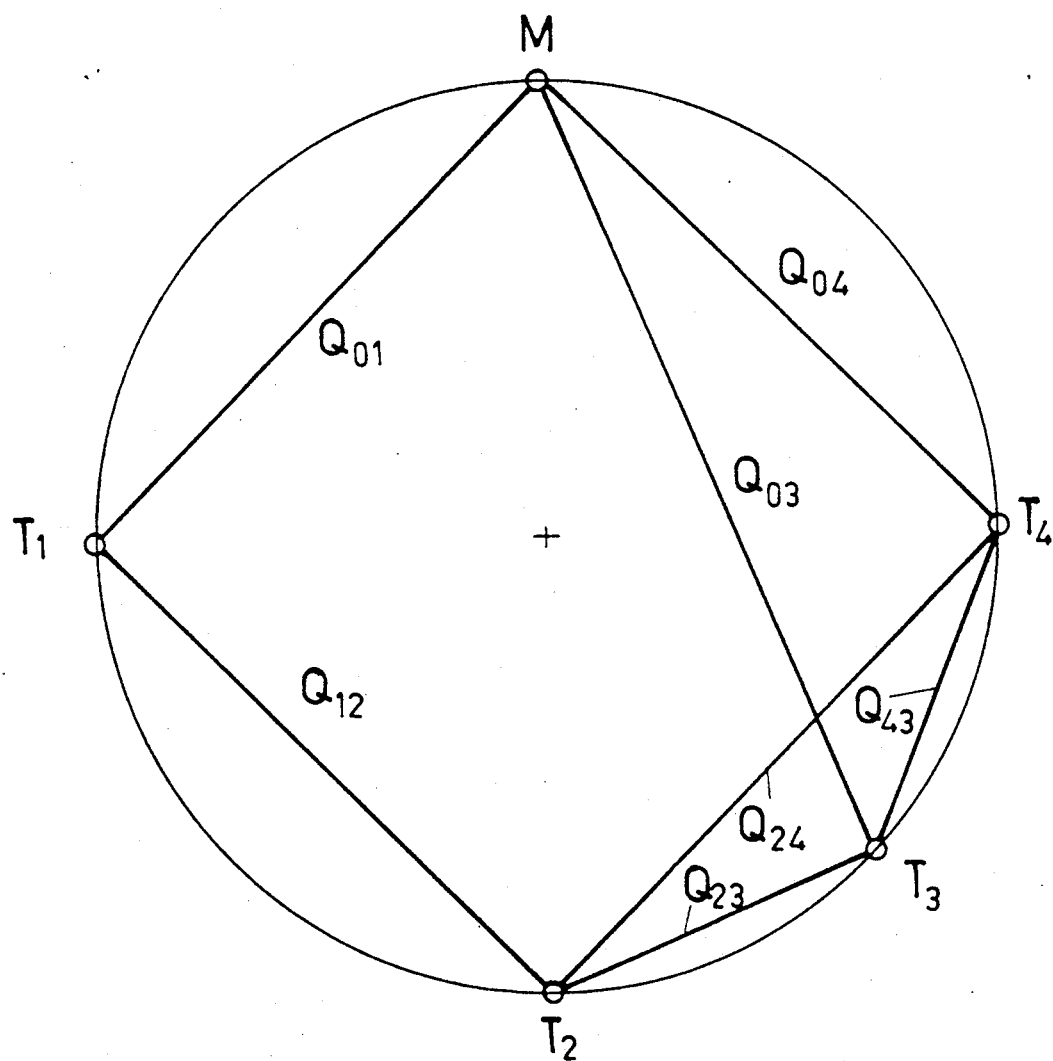
FIG. 2 shows a logical connecting structure in a network having a master station and four subscriber stations.

FIG. 2 shows an example of a logical connecting structure in a network having a master station M and four subscriber stations T1, ..., T4. Each line drawn represents a possible direct connection.

In the present example, the master station M can enter directly into contact with the three subscriber stations T1, T3, T4. On the other hand, there is no direct connection to the subscriber station T2. However, since this subscriber station T2 is in direct connection with all the other subscriber stations T1, T3, T4, the master station is able to use one of the three subscriber stations T1, T3, T4 as a relay and thus set up an indirect connection.

Each direct connection is defined by its transmission quality $Q_{ij}$. A connection must have a minimum transmission quality so that it can be adopted as such into the logical connecting structure.

On the basis of the transmission quality levels Qij prevailing in the network, the master station calculates at least one data routing for each subscriber station. This data routing determines which subscriber stations (if any at all) are to be used as relays when transferring a data packet.

In the present example, the transferral between master station M and one of the three subscriber stations T1, T3, T4 occurs directly; the transferral between master station M and subscriber station T2 occurs for example via the subscriber station T3. An alternative data routing could occur for example via the subscriber station T1 or T4.

The transmission quality is continuously monitored by each subscriber station. If it no longer fulfills the given criterion, this is reported to the master station.

According to a preferred exemplary embodiment, for this purpose each subscriber station intercepts the data traffic received at it, records the transmitting station and as the transmission quality for example the ratio of signal to noise of a data packet and reports the corresponding variables to the master station at the given time.

Alternatively or in addition, the master station in turn can monitor each data routing through a quality characteristic. If the quality characteristic no longer fulfills a given criterion, the master station determines a new data routing in consideration of the transmission quality levels recorded by the subscriber stations.

A suitable variable for a quality characteristic is the average number of interference-induced repetitions of a data packet. As a criterion, a maximum number of repetitions within the, for example, last hundred data packets transferred to a particular subscriber station could be used.

The process according to the invention is thus characterized by the following steps:
(a) Interception of the on-going data traffic and recording of the transmission quality at the master station and at the subscriber stations;
(b) Reporting of the recorded transmission quality levels to the master station;
(c) Determination of one or more data routings for each subscriber station;
(d) Transferral of data packets according to the data routing.

The process according to the invention can be advantageously used to incorporate new subscriber stations into the existing network. This is explained below with reference to FIG. 2.

In a first example let it be assumed that the subscriber station T3 is new. The master station thus only knows the three subscriber stations T1, T2, T4 and only exchanges data packets with them. The new subscriber station T3 however intercepts the on-going data traffic and records at which transmission quality levels Q03, Q13, Q23, Q43 said subscriber station T3 receives the master station M or the subscriber stations T1, T2, T4 respectively.

At certain regular or irregular times the master station M tests whether new subscriber stations are to be incorporated into the existing network. For this purpose, it makes a special information request which is directed to all non-incorporated subscriber stations.

With the corresponding data packet a quality characteristic is transferred which qualifies the connection existing between master station and new subscriber station. A suitable embodiment consists for example in the quality characteristic characterizing the transmission quality of the connection lying between master station and that subscriber station which carries out the special information request in a remote part of the network on behalf of the master station. In such a case, the special information requests transmitted directly from the master station are characterized with a correspondingly high quality characteristic.

If the transferred quality characteristic fulfills a given criterion, the new subscriber station replies to the special information request and reports the recorded transmission quality levels Q03, Q13, Q23, Q43 to the master station M.

The master station M integrates the new subscriber station T3 into the logical connecting structure by determining at least one data routing based on the transmission quality levels Q03, Q13, Q23, Q43. In this way, the process is terminated.

If a special information request of the master station remains unanswered, in addition to the insignificant case that there is no new subscriber station to be incorporated, there are two possibilities:
1. The quality characteristic does not fulfill the given criterion, or
2. The new subscriber station has not been able to pick up the special information request.

In order to be able to treat these two cases, the master station has to delegate the special information request to a subscriber station. In a delegated special information request, the quality characteristic contains the transmission quality between master station and deputizing subscriber station.

If, for example as in FIG. 2, the subscriber station T2 is to be incorporated, the master station must delegate the special information request for example to the subscriber station T3. The quality characteristic then contains the transmission quality Q03 of the corresponding connection. When testing the quality characteristic, the new subscriber station T2 can in particular also include the transmission quality Q23 recorded by it.

In the existing network, each subscriber station is identified by a short network address. Since a new subscriber station does not yet have one, it replies to a special information request preferably with a completely unique and thus correspondingly long serial number. As soon as the subscriber station then has a network address, it no longer pays any attention to the special information requests for incorporation which are issued at regular or irregular intervals.

In conclusion it can be said that the invention provides a flexible process for the efficient transferral of data packets, which process is particularly suitable for supervisory systems in low- and/or medium-voltage networks.

Obviously numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A process for transferring data packets in a network having a master station and a plurality of subscriber stations, wherein the subscriber stations are connected to the master station by a common data channel which has a location and time-dependent transmission reliability, wherein:

the subscriber stations record data packets received by them on the common channel and in each case record a variable for determining the transmission quality of said data packets;

the subscriber stations report the recorded and determined transmission quality levels to the master station;

the master station determines at least one data routing for each subscriber station on the basis of a logical connecting structure which lists all direct connections having a minimum transmission quality;

said data routing indicates whether a particular subscriber station is directly connected to the master and if not, which other subscriber stations are to be used as a relay when exchanging data packets between master station and the particular subscriber station; and data packets which are intended for at least one of the subscriber stations are transferred according to the determined data routing.

2. A process as claimed in claim 1, wherein each subscriber station continuously records the transmission quality and wherein the data routing is renewed if the transmission quality does not fulfill a given quality criterion.

3. A process as claimed in claim 3, wherein the master station tests the transmission quality from time to time.

4. A process as claimed in claim 4, wherein the transmission quality is tested by reference to an average number of interference-induced repetitions.

5. A process as claimed in claim 1, wherein the transmission quality is calculated with the aid of the ratio of signal to noise.

6. A process as claimed in claim 1, wherein the master station repeats the special information requests for the incorporation of new subscriber stations at certain, regular or irregular intervals.

7. A process as claimed in claim 1, wherein the lines of an electrical power distribution network at the low- and medium-voltage level are used as a common data channel.

8. A process as claimed in claim 1, wherein FH/PSK signals are used for the exchange of data.

9. A process for incorporating a new subscriber station into a network having a master station and a plurality of subscriber stations, wherein the subscriber stations are connected to the master station by a common data channel which has a location and time-dependent transmission reliability, wherein:

a subscriber station which is to be newly incorporated into the network intercepts the on-going data traffic between the master station and the subscriber stations which are already incorporated into the network and records the transmission quality levels at which said new subscriber station receives the ongoing data traffic between the master station and the subscriber stations which are already incorporated;

the master station issues a special information request for the purpose of incorporating the new subscriber station, said special information request containing a quality characteristic for the connection formed between the master station and the new subscriber station; and this new subscriber station only replies to the special information request and only reports the recorded transmission quality levels to the master station if the quality characteristic fulfills a given criterion.

* * * * *